United States Patent Office

3,337,410
Patented Aug. 22, 1967

3,337,410
METHOD OF DEHYDRATING HEPARIN CONTAINING ANIMAL MUCOSA
Kenneth J. Gross, Northridge, Thomas Nitta, West Los Angeles, James Wallace Sawhill, Canoga Park, and Robert Earl Williams, Northridge, Calif., assignors to Rexall Drug and Chemical Company, Los Angeles, Calif., a corporation of Delaware
No Drawing. Filed June 29, 1964, Ser. No. 378,994
3 Claims. (Cl. 167—74)

ABSTRACT OF THE DISCLOSURE

The invention is directed to a method for dehydrating heparin-containing animal mucosa at atmospheric pressure and a temperature of between 140° F. and 260° F. wherein loss of heparin potency is minimized through the addition to said mucosa of at least 0.5% of its weight of an alkali metal bisulfite.

---

The present invention is directed to a method of dehydrating animal mucosa while minimizing the loss of heparin contained therein.

Mucosa from animals, such as hog casing mucosa, has proved to be an economic source of the substance heparin which is widely used as an anticoagulant in medical practice. Animal mucosa in its raw state contains less than about 15% solids with the balance being water. In view of the high water content, it is apparent that heparin recovery processes must be carried out relatively close to slaughterhouses to avoid the necessity of long distance shipments at high freight rates per unit of solid material being shipped. A problem aries, however, when the mucosa requirements of a heparin recovery operation exceed the supply from local slaughterhouses and there has long been the need for an economic means to dehydrate such mucosa to permit shipment at minimum expense. A further problem in handling mucosa in its raw state is its great tendency to undergo bacterial and enzymatic decomposition. This necessitates use of mucosa within a short time after its receipt by a heparin recovery plant.

Attempts to dehydrate animal mucosa in conventional drying equipment at ordinary atmospheric pressures have not proved successful in view of large losses of heparin in the drying operations. It has been found that the dehydration of mucosa must be carried out at temperatures below 140° F. if heparin losses are to be minimized. Dehydration at such reduced temperatures necessitates a relatively high vacuum drying operation which is costly and goes far towards eliminating any advantage through water removal in terms of reduction in shipping costs.

It is a primary object of this invention to provide a method of dehydrating animal mucosa while minimizing the loss of heparin contained therein under conditions not requiring high vacuum drying operations. Other objects and the advantages of this invention will become apparent from the following detailed description.

The invention sought to be patented resides in a process of adding to animal mucosa, or its hereinafter described equivalents, at least 0.5% of its weight of an alkali metal bisulfite and heating the resulting mixture to a temperature of 140° to 260° F. for a time sufficient to yield a product containing a substantially lower percentage of water than that contained in the input mucosa.

The present invention is adaptable to the treatment of any animal mucosa, although hog casing mucosa is the preferred material due to its ready availability and high heparin content. As is well known in the art of heparin recovery, there are other animal tissues such as beef lungs, beef rounds, and the like, which are also used as sources of heparin. Such materials in their raw state contain relatively high water content and these are amenable to dehydration to remove substantial proportions of the water contained therein to yield products adapted to shipment at minimum cost. Such alternate naturally occurring materials are the full equivalents of animal mucosa in the method of this invention and their treatment thereby results in preparation of a dehydrated animal tissue source with minimal loss of the heparin content of the input material.

In accordance with the invention, an alkali metal bisulfite, with sodium bisulfite being preferred, is added to the animal mucosa or its hereinabove described equivalents in an amount of at least 0.5% of the weight of the mucosa. It has been found that the use of an alkali metal bisulfite in an amount of about 1.5% by weight of the mucosa is particularly desirable in carrying out the method of this invention.

After the addition of the alkali metal bisulfite, the resulting mixture is heated to a temperature in the range of 140° F. to 260° F. for a time sufficient to yield a dehydrated product containing the desired water content. Normally, temperatures in the range of 180° to 220° F. will be employed and the drying carried out for a time sufficient to yield a dehydrated product containing less than about 50% by weight of water. Under these conditions, assuming that the input mucosa contains 10% solids, the resulting product will weigh only one-fifth that of the input material, thus being transportable at markedly reduced freight costs.

The treatment of animal mucosa or its hereinabove described equivalents with an alkali metal bisulfite will result in a mixture having a pH slightly on the acid side. The pH is not critical in the process and can range between wide limits. It is desirable, however, to avoid pH values below about 3 or above about 11 since under these conditions some destruction of heparin will occur.

The method of the invention results in the preparation of a markedly lighter material with minimal heparin losses across the drying step. Recoveries in excess of 10,000 U.S.P. heparin units per pound of input mucosa are obtained. The substantially dehydrated product prepared by the method of this invention is stable and thus may be processed for recovery of heparin either immediately or after a storage period. It is readily reconstituted with water and the resulting slurry processed for the recovery of heparin by any of the techniques commonly known in the art, for example, the procedure described in U.S. Patent 2,884,358.

The best mode contemplated by the inventor will now be set forth as follows:

Example

A 200 gram quantity of hog casing mucosa (10% solids by weight) is treated with 1.5 percent of its weight of sodium bisulfite and heated under atmospheric pressure with constant stirring. After three hours, the source of heat is removed and the resulting dehydrated mucosa shows a water content of 20% by weight. Assay of the dehydrated product in comparison with that of the starting material shows substantially quantitative heparin recovery across the drying step.

In contrast, a similar lot of hog casing mucosa upon drying under atmospheric pressure without the presence of sodium bisulfite shows a loss of 50% of heparin activity.

The subject matter which the applicants regard as their invention is particularly pointed out and distinctly claimed as follows:

What is claimed is:

1. A method of dehydrating animal mucosa with minimal loss of heparin contained therein which comprises adding an alkali metal bisulfite to said mucosa in an amount of at least 0.5% by weight of the mucosa and heating the mixture to a temperature between 140° F. and 260° F. for a time sufficient to yield a mucosa containing a substantially lower percentage of water than that of the input mucosa.

2. A method according to claim 1 wherein said alkali metal bisulfite is present in an amount of about 1.5% by weight of said mucosa and the temperature is maintained between 180° F. and 220° F. for a time sufficient to yield a dehydrated mucosa containing less than 50% by weight of water.

3. A method according to claim 2 wherein said alkali metal bisulfite is sodium bisulfite.

References Cited
UNITED STATES PATENTS

| | | | |
|---|---|---|---|
| 3,039,931 | 6/1962 | Beck | 167—74 |
| 3,112,246 | 11/1963 | Hermann | 167—74 |

ALBERT T. MEYERS, *Primary Examiner.*

SAM ROSEN, *Examiner.*